No. 636,316. Patented Nov. 7, 1899.
E. H. BROWN.
GANG EDGER.
(Application filed Feb. 14, 1899.)
(No Model.)

Witnesses
L. C. Hills
H. S. Gaither

Inventor
Edmond H. Brown
by Watson E. Coleman
Attorney

THE NORRIS PETERS CO., PHOTO-LITHO., WASHINGTON, D. C.

UNITED STATES PATENT OFFICE.

EDMOND H. BROWN, OF PORT ALLEGHANY, PENNSYLVANIA, ASSIGNOR OF NINE-TENTHS TO J. M. KEENY, W. R. VENTRES, C. O. DOLLEY, M. A. LILLIBRIDGE, GEORGE PLOOF, S. L. YOUNG, J. B. COLCORD, PAT BRIDER, S. C. SARTWELL, AND J. B. SOUTHARD.

GANG-EDGER.

SPECIFICATION forming part of Letters Patent No. 636,316, dated November 7, 1899.

Application filed February 14, 1899. Serial No. 705,489. (No model.)

*To all whom it may concern:*

Be it known that I, EDMOND H. BROWN, a citizen of the United States of America, residing at Port Alleghany, in the county of McKean and State of Pennsylvania, have invented certain new and useful Improvements in Gang-Edgers; and I do hereby declare the following to be a full, clear, and exact description of the invention, such as will enable others skilled in the art to which it appertains to make and use the same.

This invention relates to an improved attachment to gang-edgers for the purpose of preventing the lumber in process of being sawed or split from being forced back by any action of the saws or machinery toward the rear end of the edger and endangering the operator feeding the edger.

The invention consists of a special system of parts comprising several improved features relating to the class to which it belongs.

Figure 1:
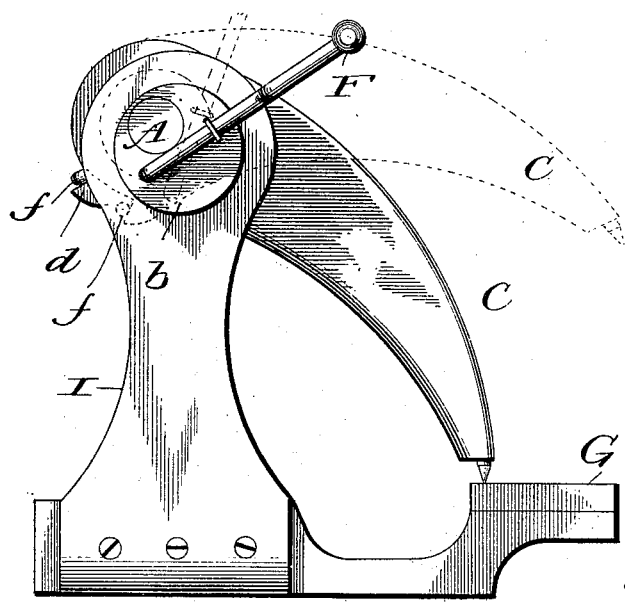
Figure 3:
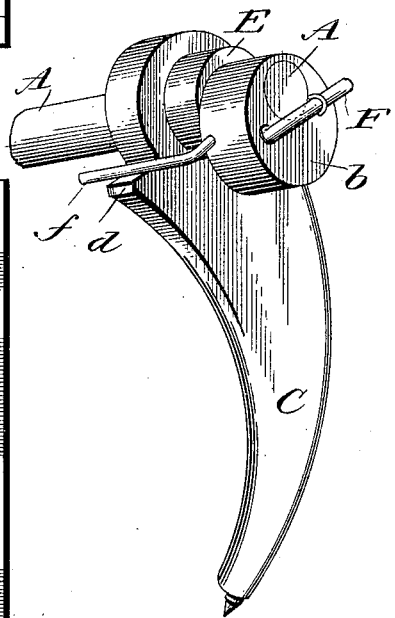
Figure 2:
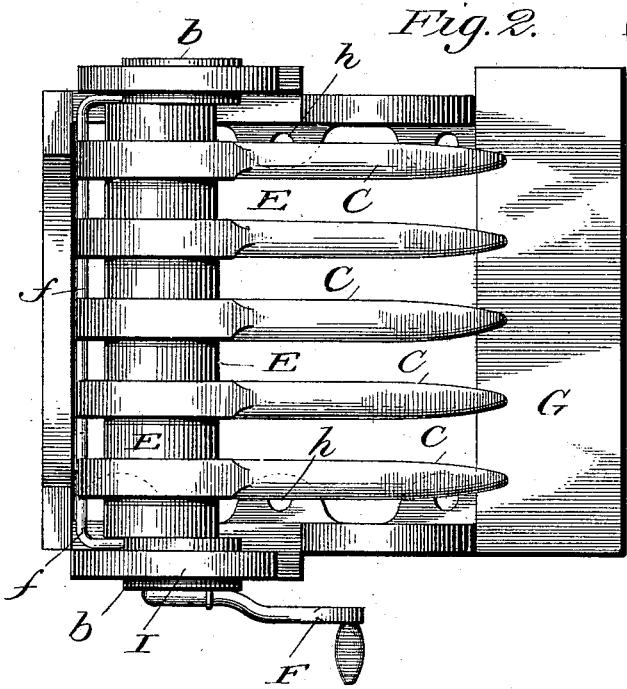

Figure 1 is a side view, and Fig. 2 a top view or perspective from above. Fig. 3 is a detail of parts.

A is a roller or rod of any desired material and eccentrically pivoted in a short roller of larger circumference, as shown at $b$.

C is one of a series of sharp-pointed dogs or fingers which swing loosely upon the roller A and which are notched at the larger end $d$.

E is one of a series of washers upon roller A and placed between the fingers or dogs C for the purpose of holding them a convenient distance apart.

$f$ is a rod of any suitable material and adjusted upon the short rollers $b$, as shown, so as to engage with the notches $d$ when the roller $b$ is turned backward by means of a crank F and lift the sharp-pointed ends of the fingers or dogs C at any desired time.

G is a platform or board upon which the pointed ends of the fingers or dogs C rest when they are not engaged with the lumber passing through the edger and is so arranged as to admit of the free passage of the lumber over it in order that the fingers or dogs C may engage with and pass over the lumber as it goes through the edger.

$h$ are holes in the lower part of the frame, by which the same may be attached to the frame of the gang-edger by bolts or screws or other suitable means.

I is a standard of the frame, which supports the rod or roller upon which the dogs or fingers C are suspended. These standards have each a hole at the top, in which the short rollers $b$ revolve when turned by the crank F.

Having thus described my invention, what I claim, and desire to secure by Letters Patent, is—

The combination of a suitable frame to be fastened to the frame of the gang-edger; a rod or roller eccentrically pivoted at both ends in short rollers which revolve in standards of the frame; a series of dogs or fingers loosely suspended upon the rod or roller and which are notched at the upper ends and sharp-pointed at the lower; washers upon said rod to hold the dogs or fingers a suitable distance apart; a crooked rod of suitable material secured at each end in the short rollers and passing over the upper ends of the dogs or fingers so as to engage with the notches in said fingers or dogs when the roller is turned backward by means of a crank attached to one of the ends and elevate the pointed ends of the dogs or fingers, substantially as described.

In testimony whereof I affix my signature in presence of two witnesses.

EDMOND H. BROWN.

Witnesses:
JOSEPH M. KEENY,
CHESTER O. DOLLEY.